UNITED STATES PATENT OFFICE 2,605,190

MAGNESIUM OXYCHLORIDE CEMENT GRADE MAGNESIA

Teynham Woodward, Los Altos, and Fred Melhase, Newark, Calif., assignors to Food Machinery and Chemical Corporation, New York, N. Y., a corporation of Delaware No Drawing. Application February 7, 1950, Serial No. 142,946

5 Claims. (Cl. 106—106)

This invention relates to the production of a new article of commerce which may be defined broadly as a calcined, dolomitic-magnesite of magnesium oxychloride cement grade. Upon admixture of this new product with conventional magnesium chloride gauging solution, a cement is produced which exhibits a linear expansion meeting the specification requirements of commercial installations.

Magnesium oxychloride grade magnesias have heretofore been produced primarily from relatively pure magnesite ore, but the supply of such product in the United States is becoming limited. At the present time some dolomitic-magnesite, or impure magnesite containing excessive amounts of lime have been successfully used in cement production, but only by the employment of some undesirable practices.

One of the practices involves doctoring the magnesium oxychloride gauging solution by adding thereto a quantity of some salt compound in a measured quantity, but this procedure for optimum results requires the user to test each batch or shipment of magnesia and to alter the gauging solution to balance or overcome the observed excess of free lime therein. Users have either not tested the magnesia and have merely guessed the amount of "doctoring" required or have employed insufficient care in testing when such has been done, and as a result, many poor grade cement installations have been made.

An object of the invention is to provide a magnesium oxychloride grade magnesia of constant or unvarying quality from dolomitic magnesite of variable quality or lime impurity content, whereby users of the magnesia may produce a high grade cement, without such testing and alteration of the gauging solution, having optimum or no excessive expansion properties on setting or hardening. Another object is to provide magnesia from such source without appreciably increasing the cost of production and to permit users to produce cements therefrom with less trouble and at a lower cost.

Broadly considered, the invention involves intimately mixing calcined dolomitic-magnesite with sulfuric acid in an amount predetermined by test to restrict the expansion of the cement produced therefrom within maximum tolerable limits. The magnesite to which the invention is applicable, referred to as dolomitic-magnesite, comprises those magnesite ores containing calcium carbonate, or other compounds of calcium, which yield active lime on calcination as an impurity. The calcined dolomitic-magnesite usually employed contains from two to five per cent total lime or from 1.5 to 3.5 per cent active lime, but highly dolomitic-magnesites can be employed if better grades are not available. Suitable varieties are mined in Nevada, California, Washington and Texas.

The amount of acid to be added to the calcined product if optimum results are to be obtained, must be ascertained empirically by determing the expansion characteristics of test samples. All successive batches of calcined magnesias having the same free lime content as that used in the test will require the same amount of acid. With experience as to any particular deposit of dolomitic magnesia, the amount of acid to be used can be based on the determined total lime content in the ore, and cements having expansion characteristics within tolerable limits will invariably be obtained. In all cases the amount of acid added should be sufficient to limit the linear expansion (one day) of the cement produced to less than about 0.25 per cent. This result can ordinarily be obtained by adding sufficient acid to the calcined product to reduce the active lime content below about 2.5 per cent. Preferably the linear expansion should be below about 0.15 per cent and this can be obtained by reacting with sufficient acid to reduce the active lime to an amount below about 1.5 to 2.0 per cent.

The amount of active lime present in calcined ore may be determined satisfactorily by reacting a sample of the same with a dilute solution of magnesium chloride, this reaction effecting the transformation of the active lime into calcium chloride resulting in the precipitation of a corresponding quantity of magnesium hydroxide. The reduction in concentration of the magnesium chloride remaining in solution is then measured and the active lime is calculated as equivalent to the reduced magnesium chloride concentration.

In actual practice where the total lime has been between 4 and 5 per cent in the raw magnesite, the active lime in the calcined ore has been from 1.5 to 3.5 per cent, and the amount of sulfuric acid added to the calcined material has been at the rate stoichiometrically equivalent to 85 per cent of such total lime content. Through the use of this sulfuric acid-lime ratio, the active lime content in the finished milled magnesia has ranged from 0 to 1.2 per cent.

In accordance with a preferred operation of the process under the invention, the sulfuric acid in highly concentrated condition is introduced in the required proportions into the calcined dolomitic magnesite before the cooling operation is completed or while the same is still quite hot as at a temperature of several hundred degrees. After the acid has been distributed throughout the mass during the cooling operation, the mixture or reaction mass is further thoroughly mixed or homogenized during grinding in a suitable crusher as in a roll mill. Less advantageously, the mixing of the acid with the calcined dolomitic-magnesite may be effected after the cooling operations have been completed. The addition of the acid to the calcined magnesia before the last cooling step is carried out has the advantage of the utilization of power employed in effecting the tumbling for mixing the acid with the magnesia and the advantage that any free water in the product is driven off and a dry magnesia is obtained.

Theoretically considered, the concentration of the acid employed is immaterial, but in actual practice highly concentrated acid is preferred because of lower costs and less trouble in handling. Since the presence of water in the final magnesia product is undesirable, dilute acid is not preferred when the acid is to be applied to the calcined product after it has cooled.

Example 1

A dolomitic-magnesite containing 3.61 per cent total lime (2.86 per cent active lime) was calcined in a large rotary kiln. After the calcined product had cooled, concentrated sulfuric acid was added at the rate of 0.46 equivalent of sulfuric acid per equivalent of total lime in the calcined ore. The resulting mixture was then thoroughly homogenized by milling. By this treatment the active lime was reduced to 1.29 per cent.

The resulting calcined dolomitic magnesite was then incorporated in a standard test mix in accordance with the specifications of the Oxychloride Cement Association and its expansion determined. The per cent linear expansion measured between the point of maximum contraction and one day after mixing was 0.065 as compared with that of a similar cement made with untreated calcined dolomitic-magnesite showing a linear expansion of 0.092 per cent.

Example 2

The test of Example 1 was repeated except that the calcined dolomitic-magnesite was treated at the rate of 0.69 equivalent of sulfuric acid per equivalent of total lime in the calcined ore. In this instance the one day linear expansion showed on test 0.041 per cent and the active lime content was 0.78 per cent.

Example 3

In each of several runs dolomitic magnesium ore (Sierra) was calcined in a rotary kiln and discharged into a rotary cooler. The total lime content in the calcined product varied from 4.11 to 4.55 per cent. In the intake of the cooler where the temperature of the mass was about 250° C., sulfuric acid of 98 per cent strength was added in the approximate ratio of 0.85 equivalent of acid per equivalent of total lime in the calcined ore. The ore discharged from the cooler was thereafter run through a roll mill which effected a thorough mixing of the reaction mass during grinding.

These acid treated calcined dolomitic-magnesites were incorporated in a standard magnesium oxychloride mix and cements were obtained showing one day linear expansions of from 0.052 to 0.070 per cent. The active lime contents of the products ranged from 1.05 to 1.36 per cent.

Magnesium oxychloride cements produced from the same magnesias which had not been acidified led to cements testing linear expansions of from 0.94 to 0.141 per cent, the active lime contents being between 3.28 and 3.89 per cent.

An advantage of the present invention lies in the provision of magnesium oxychloride grade magnesias of unvarying quality from dolomitic-magnesites of varying quality. Hence customers or users of the magnesia may produce cements of optimum or low expansion properties merely by adding conventional gauging solution, and no prior testing of the magnesia and no doctoring of the solution is required.

Another advantage is that the cost of producing high grade magnesium oxychloride cement installations from calcined dolomitic-magnesite is reduced. The cost of treating the magnesia with sulfuric acid is substantially less than the cost of doctoring the gauging solution with salts.

Finally the acid treatment of the calcined dolomitic-magnesite leads to magnesium oxychloride cements having somewhat superior strength characteristics as compared with corresponding cements from which active lime has not been eliminated.

It should be understood that the linear expansion tests mentioned herein and in the claims relate to results obtained by use of standard test formulations and test procedures promulgated by the Oxychloride Cement Association. The active lime values cited are also estimated by the test procedures defined by the association.

It should also be understood that the specific details given herein as to procedures and quantities are given by way of illustration, but that the invention extends to all equivalents which will occur to those skilled in the art upon consideration of the terms and scope of the claims appended hereto.

We claim:

1. A process for providing a magnesium oxychloride grade magnesia from calcined dolomitic-magnesite containing excessive lime which comprises initimately mixing such calcined dolomitic-magnesite with an amount of sulfuric acid which reacts therein and reduces its active lime content to a quantity below about 2.5%, whereby there is formed a magnesia product which on admixture with a gauging solution consisting of aqueous magnesium chloride provides cements exhibiting a linear expansion below about 0.25% between the point of maximum contraction and one day after mixing.

2. A process for proving a magnesium oxychloride grade magnesia from calcined dolomitic-magnesite containing excessive lime which comprises intimately mixing such calcined dolomitic-magnesite with an amount of sulfuric acid which reacts therein and reduces its active lime content to a quantity below about 1.5%, whereby there is formed a magnesia product composition which on admixture with a gauging solution consisting of aqueous magnesium chloride provides cements exhibiting a linear expansion not greater than about 0.15% between the point of maximum contraction and one day after mixing.

3. A process for providing a magnesium oxychloride grade magnesia from calcined dolomitic-magnesite containing excessive lime which comprises adding to the calcined dolomitic-magnesite containing the excessive lime, while still hot, a quantity of concentrated sulfuric acid correlated with the amount of active lime in the magnesia and calculated to reduce the active lime content to an amount below about 2.5%, which on admixture with a gauging solution consisting of aqueous magnesium chloride provides cements exhibiting a linear expansion below about 0.25% between the point of maximum contraction and one day after mixing, intimately mixing the acid with the calcined dolomitic-magnesite during cooling, and grinding the resulting cooled mass, whereby reaction occurs and said reduction in lime content is effected and the magnesium oxychloride grade magnesia is obtained.

4. A calcined dolomitic-magnesite in granular form produced from a raw dolomitic-magnesite having from 4 to 5% total lime, said calcined product containing an active lime content in a quantity below about 2.5% and a part of its original lime content in the form of calcium sulfate, the said product being produced by the process of claim 1 and having the property when mixed with a gauging solution consisting of aqueous magnesium chloride, of producing magnesium oxychloride cements exhibiting a linear expansion below about 0.25% between the point of maximum contraction and one day after mixing.

5. A calcined dolomitic-magnesite having from 2 to 5% total lime content in granular form containing an active lime content in a quantity below .5% and part of its original lime content as calcium sulfate, the said product being produced by the process of claim 2 and having the property when mixed with a gauging solution consisting of aqueous magnesium chloride, of producing magnesium oxychloride cements exhibiting a linear expansion of not more than 0.15% between the point of maximum contraction and one day after mixing.

TEYNHAM WOODWARD.
FRED MELHASE.

REFERENCES CITED

The following references are of record in the file of this patent:

UNITED STATES PATENTS

| Number | Name | Date |
|---|---|---|
| 830,597 | Kellen | Sept. 11, 1906 |
| 860,744 | Hammond | July 23, 1907 |
| 1,964,088 | Snell | June 26, 1934 |
| 2,030,002 | Hermann | Feb. 4, 1936 |

OTHER REFERENCES

Dow Chemical Co., Plastic Magnesia Cement—Magnesium Chloride Service Bulletin No. 9 (1927), pages 130–133.